United States Patent [19]

Pippert

[11] 4,045,037
[45] * Aug. 30, 1977

[54] PACKING

[75] Inventor: Aaron J. Pippert, Houston, Tex.

[73] Assignee: Utex Industries, Inc., Houston, Tex.

[ * ] Notice: The portion of the term of this patent subsequent to Oct. 28, 1992, has been disclaimed.

[21] Appl. No.: 623,353

[22] Filed: Oct. 17, 1975

Related U.S. Application Data

[63] Continuation-in-part of Ser. No. 444,331, Feb. 21, 1974, Pat. No. 3,915,463.

[51] Int. Cl.² ............................................. F16J 15/32
[52] U.S. Cl. ................................. 277/205; 277/123; 277/212 R
[58] Field of Search .......... 277/205, 206, 207, 212 R, 277/215, 123, 124, 125

[56] References Cited

U.S. PATENT DOCUMENTS 3,419,280  12/1968  Wheeler ............................. 277/205
3,915,463  10/1975  Pippert ............................. 277/205

FOREIGN PATENT DOCUMENTS 591,698  8/1947  United Kingdom ................ 277/206

Primary Examiner—Richard E. Aegerter
Assistant Examiner—L. Footland
Attorney, Agent, or Firm—Browning, Bushman & Zamecki

[57] ABSTRACT

A packing member, in either strip or annular form, the member comprising two lip sections adjoined to form a broad planar head surface. Each of the lip sections has a base with an outer lateral surface, and a groove extends along the entire length, or circumference, of the packing member between the bases. At least one of the lip sections includes a laterally outwardly depending sealing projection having a generally laterally outwardly facing side surface and a lower surface. In a relaxed state, the lower surface is disposed generally at an angle to the outer lateral surface of the respective base so as to be non-downwardly inclined from the outer lateral surface. The sealing projection is of such volume and cross-sectional configuration that, upon application of a generally laterally inward force to the side surface, the sealing projection is deformed to form a cavity adjacent its lower surface.

17 Claims, 6 Drawing Figures

PACKING

CROSS REFERENCE TO RELATED APPLICATIONS

This is a continuation-in-part of U.S. application Ser. No. 444,331, filed Feb. 21, 1974, now U.S. Pat. No. 3,915,463.

BACKGROUND OF THE INVENTION

1. Field of the Invention

The invention relates to packing members which may be in either annular form or in strip form and which are used to seal between two elements of an assembly which may be stationary or relatively moving. They may be used to seal between two relatively rotating elements, such as a rotating shaft and stuffing box or a stationary shaft and rotor, or between two relatively reciprocating elements such as a piston and cylinder. In any case they provide a pressure seal against the flow of a fluid between the two members. The individual packing members may be used singly in some applications and may be stacked in other applications.

2. Description of the Prior Art

One type of packing previously used in the above discussed applications is generally V-shaped in cross-sectional configuration. It has a head or top which corresponds to the apex of the V and two lips extending radially and axially away from the head to form the legs of the V. The pressure of the fluid being sealed against forces the lips apart so that one lip seals against one of the elements of the assembly and the other lip seals against the other element. One of the disadvantages of this type of packing is that adapter rings are needed at the top and bottom of a packing member, or at the top of an uppermost and the bottom of a lowermost packing member in a stack, to keep the packing members properly positioned. Not only do these adapter rings make the sealing system more complicated and expensive, but due to the additional space they consume, it is often impossible to use the system because there is not enough space for a packing member plus the adapter rings or because there is not enough room for the adapter rings plus the number of packing members needed in a stack to provide a sufficient seal for the particular application.

One improvement over this type of packing is known as a "modified V" type packing. This type still has a head and a pair of lips extending therefrom. However, the bottom of the packing includes a pedestal extending away from the head in the general direction of the lips and centrally located therebetween. The pedestal provides support so that the bottom adapter ring may be eliminated. However, the top adapter ring is still needed. Moreover, the lips are adjoined to the pedestal by relatively thin portions which reduce the wear zone. The packing tends to fracture at these thin portions particularly if it is formed of a fabric impregnated with an elastomeric, thermosetting, or thermoplastic material.

The above-mentioned U.S. application Ser. No. 444,331, now U.S. Pat. No. 3,915,463, discloses a strip or annular packing member which eliminates the need for both top and bottom adapter rings and maximizes the wear zone of the packing.

The packing member of U.S. application Ser. No. 444,331, now U.S. Pat. No. 3,915,463 includes a head having a relatively broad planar head surface and first and second lip sections. Each lip section has a laterally outwardly facing side surface and a base. A groove between the bases extends along the length, or circumference, of the packing member opening downwardly away from the head. At least one of the lip sections has a cavity extending along the length or circumference of the packing member between its side surface and the groove and also opening downwardly. The cavity forms a pressure trap and preferably its laterally outermost surface extends laterally outwardly from top to bottom. Two such cavities may be provided, one in each lip section. These cavities are preferably not as deep as the groove.

The relatively broad planar head surface of the head of the packing member eliminates the need for a top adapter ring. Furthermore, the provision of two bases, spaced apart by the groove, provides a relatively broad support region at the bottom which eliminates the need for a bottom adapter ring. Sealing ability, however, is not sacrificed. Pressure entering the cavity aids in achieving low pressure sealing by urging the lower portion of the side surface laterally outwardly. Thus, the side surfaces are forced into sealing engagement with the faces of the members being sealed by the pressure sealed against.

A wear zone or heel is provided on the side of each lip section adjacent the broad head surface of the head. The lip sections flex laterally inwardly relatively easily upon insertion of the packing member into the assembly to provide an initial seal without application of pressure. When high pressure is applied, it fills the groove bringing the wear zones into tight contact with the adjacent faces of the assembly. Thus, high pressure wear will occur primarily at the wear zones. These wear zones are maximized by the thickness of the lip sections. Thus, considerable wear can occur without danger of the lip sections breaking or a seal being lost.

SUMMARY OF THE INVENTION

The present invention pertains to a modification of the type of packing member disclosed in U.S. application Ser. No. 444,331 which prior application is hereby expressly incorporated herein by reference. Like that of the prior application, the packing member of the present invention comprises two lip sections adjoined to form a relatively broad planar head surface. Each lip section includes a base having an outer lateral surface, and there is a groove between the bases extending the length or circumference of the packing member and opening downwardly, i.e. away from the head surface. The present invention includes most of the features of application Ser. No. 444,331, now U.S. Pat. No. 3,915,463, the primary difference being that, in the present packing member, there is no cavity when the member is in its relaxed state, e.g. prior to emplacement in the assembly to be sealed. Rather, at least one of the lip sections has a laterally outwardly depending sealing projection whose lower surface is disposed at an angle to the outer lateral surface of the respective base in the relaxed state so as to be non-downwardly inclined from the outer lateral surface. Thus no cavity is formed. However, the sealing projecton is of such volume and cross-sectional configuration that, upon application of a laterally inward force to the side surface of the sealing projection, as by emplacement of the packing member in the assembly to be sealed, a downwardly opening cavity is formed adjacent the lower surface of the sealing projection. This cavity serves as a pressure trap.

As with the packing member of prior U.S. application Ser. No. 444,331, now U.S. Pat. No. 3,915,463 the relatively broad head surface of the present packing member eliminates the need for a top adapter ring. Again the relatively broad support region provided by the two bases spaced by the groove eliminates the need for a bottom adapter ring. Once the packing member has been installed in the assembly to be sealed and the cavity thus formed adjacent the lower surface of the sealing projection, the sealing action is quite similar to that described above in connection with the packing of application Ser. No. 444,331, now U.S. Pat. No. 3,915,463.

The present invention also retains substantially all of the advantages of the packing of the aforementioned prior application. In particular, it eliminates thin sections readily worn through or broken without sacrificing sealing ability. It also provides a wear zone or heel on the sealing projection adjacent the head surface, which zone is virtually free from the possibility of wearing through due to the thickness of the lip sections.

It is thus a principal object of the present invention to provide a packing member which includes a sealing projection of such volume and cross-sectional configuration that, upon application of a laterally inward force to the sealing projection, a cavity is formed adjacent its lower surface.

Another object of the present invention is to provide a packing member comprising a sealing projection having a lower surface disposed at an angle to an outer lateral surface of an adjacent base when in a relaxed state so as to be non-downwardly inclined from that outer lateral surface.

Still another object of the present invention is to provide a packing member having a unique configuration which eliminates thin sections thereby reducing the possibility of wearing through.

Yet a further object of the present invention is to provide a novel packing member which eliminates the need for top and bottom adapter rings to be used therewith.

Still another object of the present invention is to provide a novel packing member and sealed assembly combination.

Other objects, features, and advantages of the invention will be made apparent by the following description of the preferred embodiments, the drawings, and the claims.

DESCRIPTION OF THE PREFERRED EMBODIMENTS

Figure 2:
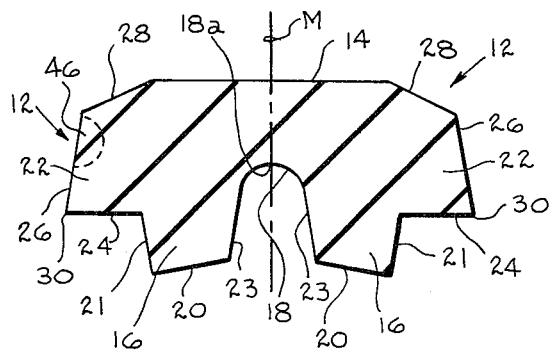
FIG. 2 is an enlarged tranverse cross-sectional view of the packing member of FIG. 1 taken on lines 2—2 of FIG. 1
Figure 1:
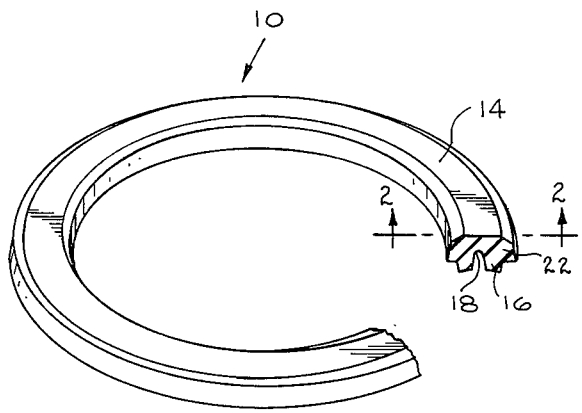
FIG. 1 is a perspective view of a first embodiment of the invention in annular form with part broken away.
Figure 3:
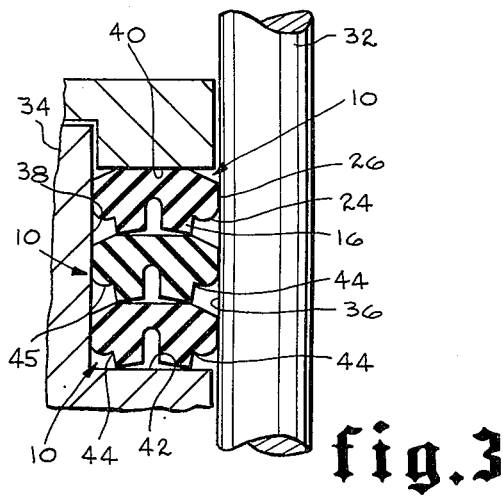
FIG. 3 is a transverse cross-sectional view of a plurality of the packing members of FIGS. 1 and 2 in use in a sealed assembly.

Referring now to the drawings, FIGS. 1-3 depict a first embodiment of the invention. In this embodiment, the packing member is in the form of an annulus or ring 10. Such an annular member is usually formed by molding. The annular packing member may be a split ring, or it may be a continuous ring molded as such or formed by permanently joining the ends of a split ring by vulcanizing, adhesive or any other suitable method. The term "annular" will be construed herein to include solid rings as well as split rings whether or not the ends have been permanently joined. As best seen in the transverse cross section of FIG. 2, the packing member 10 comprises two lip sections 12 on opposite sides of an imaginary line $m$ bisecting the cross section. The lip sections 12 are adjoined to form a relatively broad plannar head surface 14. In practice, the packing member can be disposed in any position so that there is no true "upper" part. However, that surface which lies uppermost in FIGS. 1-5 (to the left in FIG. 6) and which in use ordinarily faces away from the positive pressure being sealed against, is defined as the head surface or top; the opposite portion is defined as the bottom. Terms such as "upwardly" and "downwardly" are used herein in this sense and are not intended to imply any particular position of the packing in use.

Each of the lip sections 12 includes a respective base or pedestal 16 having an outer lateral surface 21, an inner lateral surface 23, and a lower base surface 20. The bases 16 are separated by a groove 18 centerred on the line $m$, extending around the entire circumference of the member 10, and opening downwardly away from head surface 14. The bases 16 each taper slightly inwardly from their upper to their lower portions as shown and their lower base surfaces 20 are inclined slightly downwardly from their laterally inner to their laterally outer extremities.

Each lip section 12 also comprises a generally laterally outwardly depending sealing projection 22. (Note that the expression "laterally outwardly" is used here with reference to the transverse cross section as seen in FIG. 2 rather than to the annular packing member as a whole.) Each of the sealing projections 22 comprises a lower surface 24, a generally laterally outwardly facing side surface 26, which also provides the side surface of the respective lip section, and an upper surface 28. Note, however, that the sealing projection could alternatively be continuously curved so that there would be no distinct boundaries between its upper, lower, and side surfaces. Each of the lower surfaces 24 is disposed at an angle to the outer lateral surface 21 of the base 16 of the respective lip section 12. At this point it should be noted that the term "base" herein is used somewhat differently than in prior application Ser. No. 444,331, now U.S. Pat. No. 3,915,463; in particular it will not refer to the entire lower portion of a lip section but only to that much of the lower portion which lies laterally inwardly of the respective sealing projection 22. The angle of each lower surface to the outer lateral surface of its respective base 16 is such that the surface 24 is non-downwardly inclined from the surface 21. By this is meant that if the surface 24 is substantially straight, as in FIG. 2, it is either substantially parallel to head surface 14 or inclined upwardly from surface 21 as shown. If the surface 24 were curved, "non-downwardly inclined" would imply that its curvature and angle to base 16 would be such that it had no tangent inclined downwardly from surface 21. Accordingly, no downwardly opening cavity is present adjacent either surface 24 when the packing member is in the relaxed state shown in FIGS. 1 and 2.

The side surface 26 of each of the sealing projections 22 is inclined slightly laterally outwardly from its upper to its lower extremity and intersects the respective lower surface 24 to form a relatively sharp leading edge 30. The surfaces 26 are joined to head surface 14 by the respective upper surfaces 28 of the sealing projections. Each of the surfaces 28 is inclined slightly downwardly from its laterally inner to its laterally outer extremity.

Each of the sealing projections 22 is of such volume and transverse cross sectional configuration that, upon application of a suitable force generally laterally inwardly to the sealing projection, particularly its side surface 26, a downwardly opening cavity is formed adjacent its lower surface 24. FIG. 3 illustrates three of the packing members 10 in stacked arrangement in a sealed assembly comprising rotating shaft 32 and stuffing box 34. An annular space is formed between the shaft 32 and stuffing box 34, the space being defined by side faces 36 and 38 on the shaft and stuffing box respectively and by top and bottom faces 40 and 42. When the packing members 10 are emplaced in the space, the two side surfaces 26 of each member engage respective side faces 36 and 38 whereby the lip sections 12 are deflected toward each other. At the same time, the engagement of surfaces 26, especially their lower portions, with faces 36 and 38 distorts or deforms the sealing projections 22 as shown so that a downwardly opening cavity 44 is formed adjacent each of the lower surfaces 24, in particular at its intersection with the respective base 16. The inclination of surfaces 26 not only enhances this cavity forming effect, but also cooperates with the flexing of the lip sections to provide the initial seal at zero pressure at the lower portion of each surface 26. This initial seal is tightened at low pressures as the pressure fluid below members 10 fills and expands the cavities 44. Thus a tight seal is provided at low pressures in spite of the relative rigidity of the lip sections. Each cavity 44 preferably has a laterally outer cavity surface 45 which is inclined laterally outwardly from its upper to its lower extremity. As explained in prior application Ser. No. 444,331, now U.S. Pat. No. 3,915,463, to provide a rather tight seal at relatively low pressures. Finally, at high pressures, the fluid fills and expands the grooves 18 so that a very tight seal is formed at the upper portion of each surface 26. Thus the heel or principal wear zone of each lip section 12 is in the area indicated in phantom lines at 46 on the left-hand lip section in FIG. 2. Relatively little wear occurs at the lower portions of surfaces 26 as they seal primarily at low pressures and, at high pressure, are freer to flex. Referring again to FIG. 2, the surfaces 24 are substantially lower than the innermost extremity 18a of the groove 18. Thus the cavities 44 formed adjacent surfaces 24 will be shallower than groove 18. Wear portions 46 are therefore spaced substantially above the cavities 44 in use so that wear at portions 46 will not be likely to cause the lower portions of the sealing projections to break off. Even if these portions did break, the bulk of the lip sections would remain intact to provide the high pressure seal. At the same time the thickness of the lip sections and the breadth of the head surface 14 virtually eliminate the possibility of breaking off of the lip sections. It will be appreciated that the portion 46 would have to wear almost all the way to groove 18 before the lip section could break off.

The breadth of the head surface 14 (more than half the total breadth of the transverse cross section of the packing member) also eliminates the need for a top adapter ring. Similarly, the two bases 16, spaced apart by the groove 18, provide a broad support region which eliminates the need for a bottom adapter ring. The inclination of lower base surfaces 20 allows the bases to easily expand away from each other upon application of pressure to compensate for slight variations in the diameters of the elements of the assembly, wear of the packing member, etc.

Figure 5:
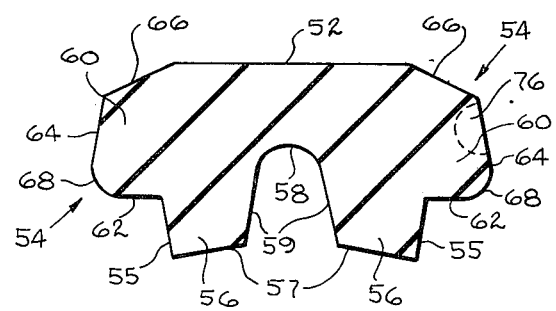
FIG. 5 is an enlarged transverse cross-sectional view of the packing of FIG. 4 taken on lines 5—5 of FIG. 4.
Figure 4:
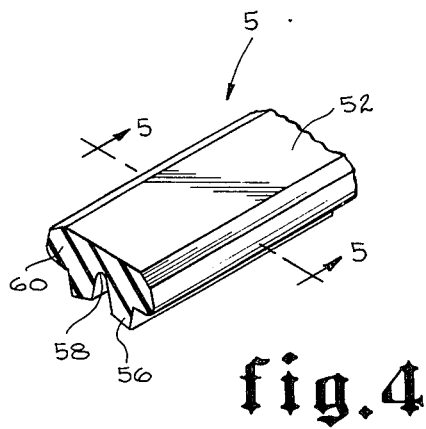
FIG. 4 is a perspective view of a second embodiment of the invention in strip form.
Figure 6:
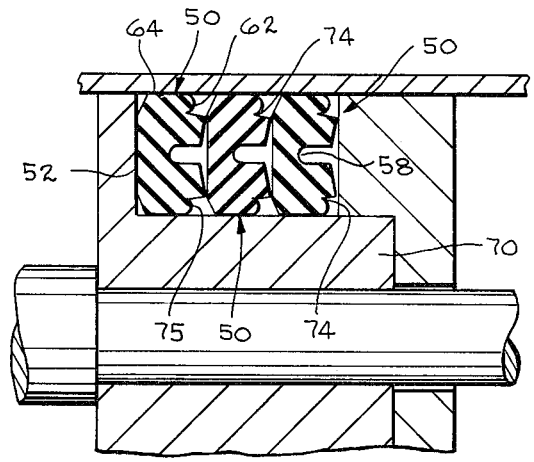
FIG. 6 is a transverse cross-sectional view of a plurality of the packing members of FIGS. 4 and 5 in use in a sealed assembly.

Referring now to FIGS. 4-6, there is shown a second embodiment of the invention in the form of a strip packing member 50. This type of packing is typically extruded or otherwise formed in relatively long strips intended primarily for field or emergency use. A piece of the strip can be cut in an appropriate length and formed into an annulus for use. The ends of the piece can be joined by any suitable joint and/or a bonding vulcanizing, or adhesive process. As best seen in FIG. 5, the cross-sectional configuration of the packing member 50 is very much like that of annular member 10. In particular packing member 50 comprises two lip sections 54 adjoined to form a broad planar head surface 52. Each lip section 54 comprises a base 56 having an outer lateral surface 55, an inner lateral surface 59, and a lower base surface 57, and the bases 56 are spaced by a groove 58. Each lip section 54 also comprises a sealing projection 60 having a lower surface 62, a laterally outwardly facing side surface 64, and an upper surface 66. It can be seen that the packing member 50 is symmetrical about an imaginary plane bisecting the groove 18.

The inclination of each of the surfaces 62, 64, and 66 with respect to one another and to other parts of the packing member is substantially the same as that of the corresponding surface 24, 26 or 28 of the embodiment of FIGS. 1-3. In particular, the lower surfaces 62 are each disposed at an angle to the outer lateral surfaces 55 of their respective bases 56 so as to be non-downwardly inclined from surfaces 55. Side surfaces 64 are inclined slightly laterally outwardly from their upper to their lower extremities. The primary difference in the cross-sectional configuration of the embodiment of FIGS. 1-3 and that of FIGS. 4-6 is that in the latter embodiment each side surface 64 is joined to its respective lower surface 62 by a rounded corner portion 68.

FIG. 6 illustrates a stack of the packing members 50 being used to seal an annular space between a piston 70 and cylinder 72. As in the first embodiment, the lip sections of each member 50 have been deflected toward each other and each of the sealing projections 60 have been deformed by the laterally inward force of the piston or cylinder on their side surface. Cavities 74 have thus been formed adjacent the lower surfaces 62 opening downwardly away from the head surface 52. The sealing action is similar to that of the embodiment of FIGS. 1-3. A seal is formed at the lower portion of each surface 64 at low pressures tightened by pressure fluid in cavities 74. Again this action is enhanced by the laterally outward inclination of laterally outermost cavity surfaces 75 of cavities 74 from their upper to the lower extremities. At high pressures, the pressure fluid fills and expands the grooves 58 so that a tight seal is formed at the upper portion of each surface 64. A heel or primary sealing zone 76 is thus provided at each surface 64 adjacent the head surface 52. Once again the broad head surface and thick lip sections ensure against breaking off of the lip sections, while the relative depth of groove 58 and cavities 74 help to ensure against breaking of the sealing projection.

The packings of the present invention can be formed from numerous different materials. The packings can be made from thermoplastic materials, thermosetting materials, fabric reinforced thermosetting materials, fabric reinforced thermoplastic materials, mixed thermoplastic thermosetting materials or any combinations of the above. In effect, the packing can be homogeneous or heterogeneous in that it can be made of a single material or a homogeneous blend of multiple materials, or it can be made of a plurality of different materials. It should also be recognized that the packing can be constructed such that various portions, such as, for example, the heel portions mentioned above, can contain reinforcing material for added strength. In the latter respect, the packing herein can be constructed in accordance with the teaching contained in U.S. Pat. No. 3,719,366. The term thermosetting, as used herein, applies to those resins, generally synthetic in nature, which solidify or set on heating and cannot be remelted. Non-Limiting examples of such thermosetting resins include phenolics, alkyds, amino resins, polyesters, epoxies silicones and the like. The term thermoplastic, as used herein, applies to those resins, generally synthetic in nature, that may be softened by heat and then regain their original properties upon cooling. Non-limiting examples of such thermoplastic materials include nylon, polyethelene, polypropylene, cellulose and acrylic resins, polycarbonates and the like. In addition to the above materials, the packings can be constructed of resilient materials such as natural or synthetic rubber or some other such natural or synthetic elastomeric material. The packings can be made of such elastomeric materials alone or in combination with fabrics, various thermoplastic or thermosetting resins, or mixtures of any of the foregoing. Typical such elastomerics include polychloroprene, styrene-butadiene rubbers, styreneacrylonitrile-butadiene terpolymers, fluoroelastomers such as copolymers or vinylidine chloride and hexafluoropropylene, polyurethane and other such synthetic polymeric materials which are generally resilient and elastomeric in nature.

As noted, the packings can comprise a thermosetting or a thermoplastic material reinforced with a fibrous material which can be in the form of a cloth or as a chopped or flocked filler. The terms fabric or fibrous materials, as used herein, refer to any material obtained by weaving or any other such techniques wherein the matrix consists of a lattice work or web of thread or like elements. Numerous materials fall into this class such as, for example, cotton, asbestos, fiber glass, nylon, polyesters, linen, rayon and the like. Furthermore, blends of various materials such as cotton-polyester fabrics, rayon-polyester fabrics, etc., may also be employed.

It will be apparent from the foregoing, that the materials of construction of the packing herein is virtually unlimited and will depend upon the environment in which the packing is used. Accordingly, the foregoing description pertaining to the types of materials employed and the manner of constructing the packing is intended to be merely exemplary and not exhaustive.

As noted above, either the entire packing member or suitable portions thereof can be reinforced with a fibrous material or fabric. This construction gives added strength and durability to the reinforced part thereby alleviating wear and increasing the life of the packing member. Even through the fabric reinforcement also renders the packing member more brittle, it has been found that, due to the unique cross-sectional configuration of the packing member, the relatively thick lips do not fracture. It should also be noted that the portion of the packing member from the apex of the groove 18 or 58 upwardly to the head surface 14 or 52 is sufficiently thick to prevent the packing breaking in this area.

It will be appreciated that many modifications can be made in the forms of the preferred embodiments described above. For example, both annular and strip packing members can be formed with the cross-sectional configuration of either of the embodiments shown as well as other configurations. In some instances, it may be necessary to provide the sealing projection on only one of the lip sections, and this sealing projection may be disposed on either the ID or the OD of the packing member in use. It is thus intended that the scope of the invention be limited only by the claims which follow.

I claim:

1. An elongate strip packing member comprising:
first and second lip sections adjoined to form a relatively broad planar head surface, each of said lip sections including a base having an outer lateral surface; said packing member having a groove between said bases extending the length of said packing member and opening downwardly away from said head surface; said first lip section further including a laterally outwardly depending sealing projection, said sealing projection having a generally laterally outwardly facing side surface and a lower surface, said lower surface being adjoined to the outer lateral surface of said base of said first lip section and, in a relaxed state, being generally inclined from its laterally inner to its laterally outer extremities at an angle greater than or equal to 90° with respect to a line normal to said head surface, and said sealing projection being of such volume and transverse cross-section configuration that upon application of a generally laterally inward force to said side surface said sealing projection is deformed to form a cavity adjacent said lower surface, said cavity opening downwardly away from said head surface and forming a pressure trap.

2. A packing member according to claim 1 wherein said cavity is partially defined by a laterally outer cavity surface inclined laterally outwardly from its upper to its lower extremity.

3. A packing member according to claim 1 wherein said second lip section also includes such a laterally outwardly depending sealing projection.

4. A packing member according to claim 3 further being symmetrical about a plane bisecting said groove.

5. A packing member according to claim 1 wherein said side surface is inclined slightly laterally outwardly from its upper to its lower extremity.

6. A packing member according to claim 5 wherein said lower surface and said side surface converge to form a relatively sharp leading edge.

7. A packing member according to claim 5 wherein said lower surface is joined to said side surface by a rounded corner portion.

8. A packing member according to claim 1 wherein said bases have lower base surfaces extending downwardly and laterally outwardly from said groove.

9. A packing member according to claim 1 wherein said cavity is shallower than said groove.

10. An annular packing member comprising:

first and second lip sections adjoined to form a relatively broad planar head surface, each of said lip sections including a base having an outer lateral surface; said packing member having a groove between said bases extending the circumference of said packing member and opening downwardly away from said head surface; said first lip section further including a laterally outwardly depending sealing projection, said sealing projection having a generally laterally outwardly facing side surface and a lower surface, said lower surface being adjoined to the outer lateral surface of said base of said first lip section and, in a relaxed state, being generally inclined from its laterally inner to its laterally outer extremities at an angle greater than or equal to 90° with respect to a line normal to said head surface, and said sealing projection being of such volume and transverse cross-sectional configuration that upon application of a generally laterally inward force to said side surface said sealing projection is deformed to form a cavity adjacent said lower surface, said cavity opening downwardly away from said head surface and forming a pressure trap.

11. A packing member according to claim 10 wherein said cavity is partially defined by a laterally outer cavity surface inclined laterally outwardly from its upper to its lower extremity.

12. A packing member according to claim 10 wherein said second lip section also includes such a laterally outwardly depending sealing projection.

13. A packing member according to claim 10 wherein said side surface is inclined slightly laterally outwardly from its upper to its lower extremity.

14. A packing member according to claim 13 wherein said lower surface and said side surface converge to form a relatively sharp leading edge.

15. A packing member according to claim 13 wherein said lower surface is joined to said side surface by a rounded corner portion.

16. A packing member according to claim 10 wherein said bases have lower base surfaces extending downwardly and laterally outwardly from said groove.

17. A packing member according to claim 10 wherein said cavity is shallower than said groove.

* * * * *

UNITED STATES PATENT AND TRADEMARK OFFICE
CERTIFICATE OF CORRECTION

PATENT NO. : 4,045,037
DATED : August 30, 1977
INVENTOR(S) : Aaron J. Pippert

It is certified that error appears in the above–identified patent and that said Letters Patent are hereby corrected as shown below:

In Column 5, line 41, after the patent number "3,915,463" insert --this inclination helps--.

In Column 7, line 66, delete the word "through" and insert therefor --though--.

Signed and Sealed this

Twenty-first Day of March 1978

[SEAL]

Attest:

RUTH C. MASON
Attesting Officer

LUTRELLE F. PARKER
Acting Commissioner of Patents and Trademarks